United States Patent Office
2,963,064
Patented Dec. 6, 1960

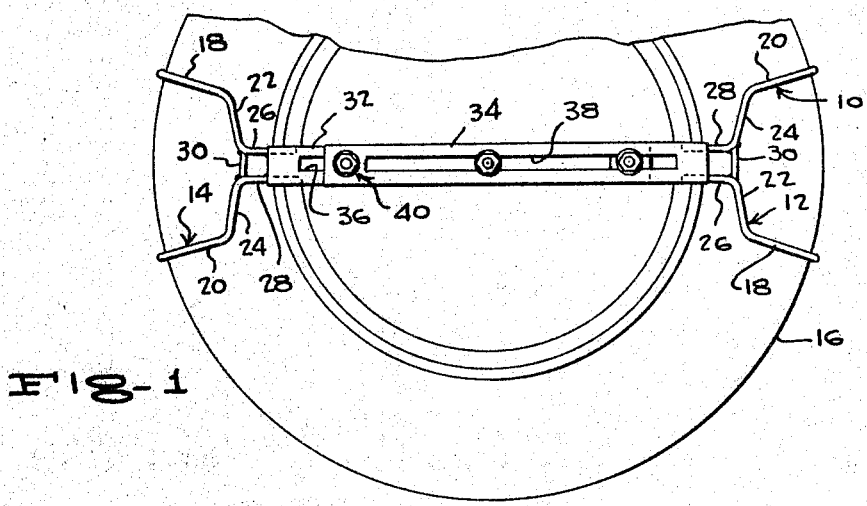
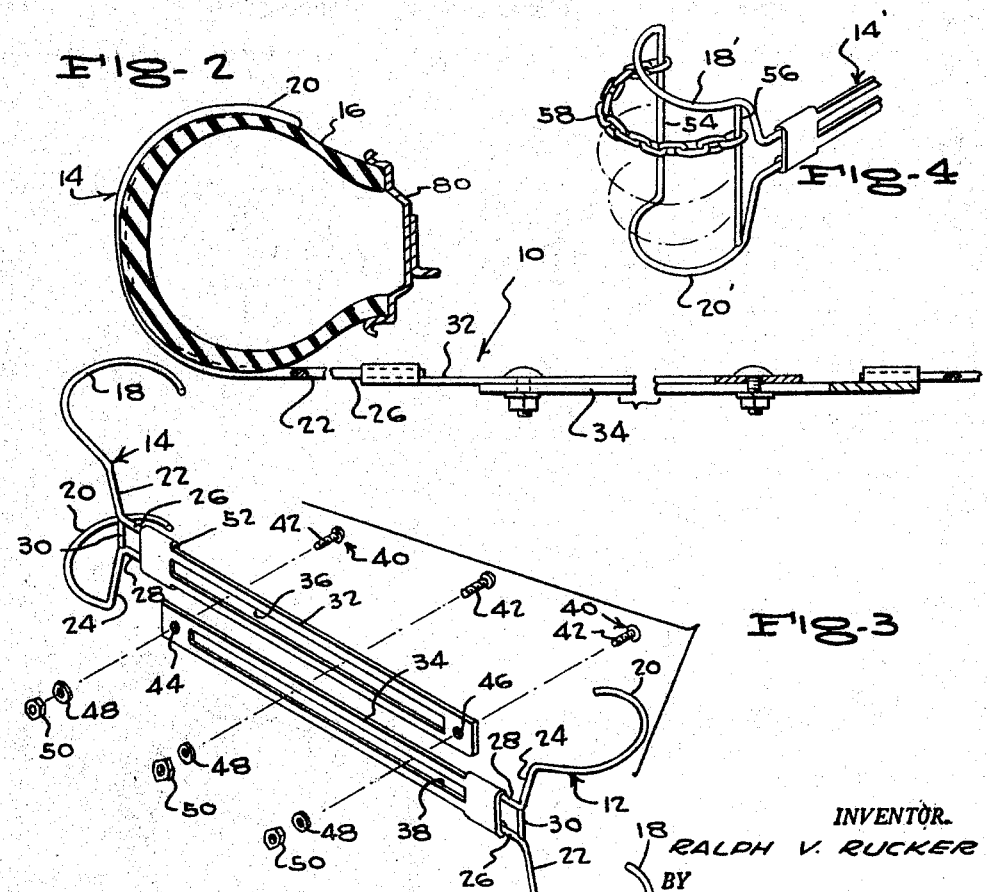

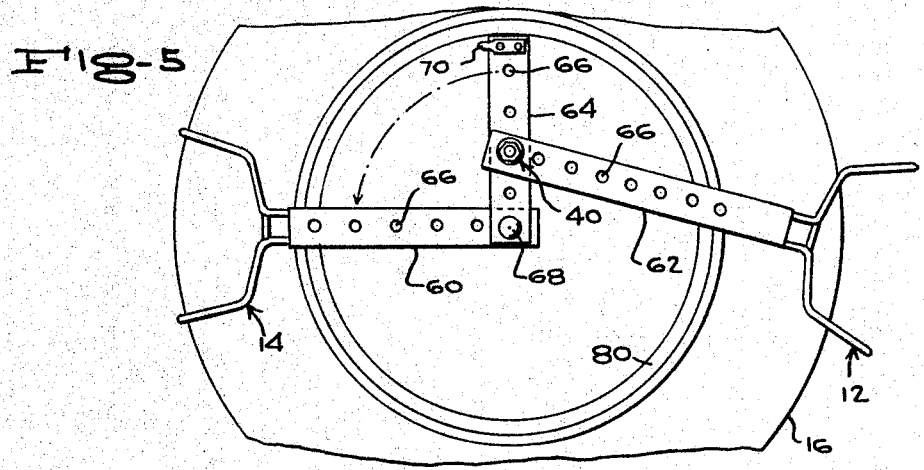
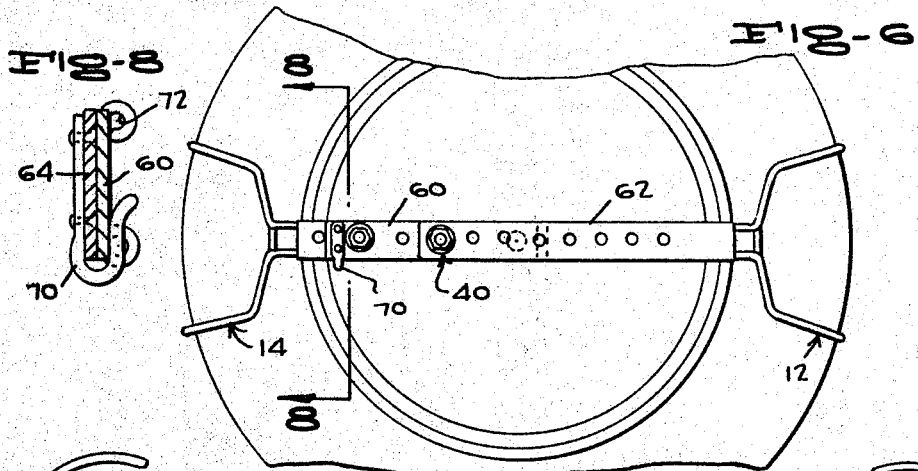
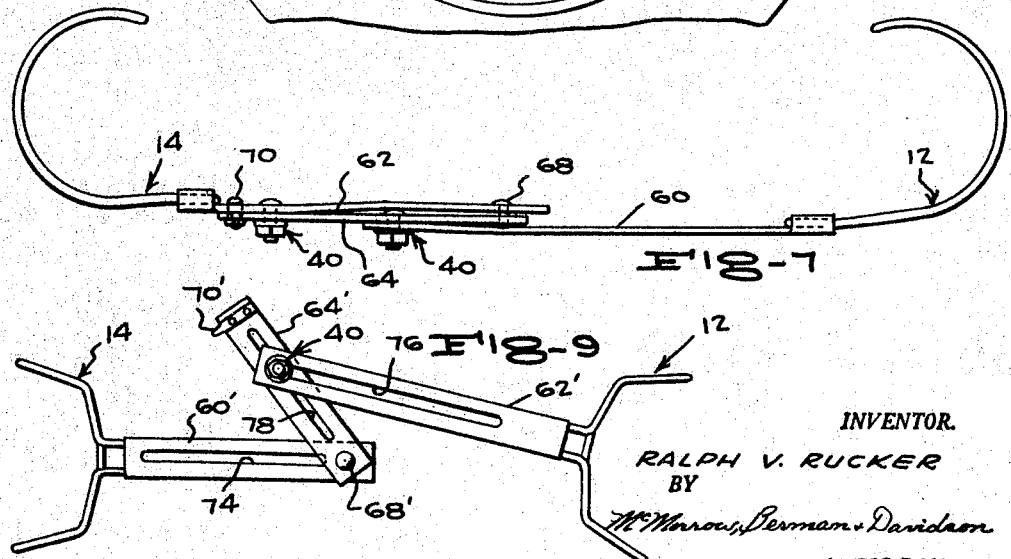

2,963,064

EMERGENCY TRACTION ASSEMBLY FOR VEHICLE WHEELS

Ralph V. Rucker, #2 Fairfax Hall, Maple Terrace, Charleston, W. Va.

Filed Apr. 3, 1959, Ser. No. 803,975

3 Claims. (Cl. 152—218)

The present invention relates generally to an emergency traction assembly for vehicle wheels which is applicable to vehicle wheels in contact with the ground without jacking up the vehicle.

An object of the present invention is to provide an emergency traction assembly for vehicle wheels which involves only two traction shoes embracing opposed portions of the periphery of a vehicle tire and which involves efficient and reliable means for drawing the shoes toward each other and locking the shoes securely on the tire.

Another object of the present invention is to provide an emergency traction assembly for vehicle wheels which lend themselves to manufacture in rugged and serviceable forms, one which is economically feasible, and one which is highly effective in action.

A further object of the present invention is to provide a traction assembly for vehicle wheels which lend themselves to easy attachment to and detachment from the tire of a wheel on a vehicle without jacking up the vehicle wheel, one which is sturdy in construction, one having long-life characteristics, and one of compact size when removed from the wheel and shifted to a place of storage.

These and other objects and advantages of the present invention will be fully apparent from the following description when taken in conjunction with the annexed drawings, in which:

Figure 1 is a fragmentary elevational view of a vehicle wheel with tire thereon, with the traction assembly of the present invention mounted on the tire;

Figure 2 is a fragmentary sectional view of the assembly shown in Figure 1, portions of the adjacent one end being broken away;

Figure 3 is an isometric exploded view of the assembly shown in Figure 1;

Figure 4 is a fragmentary isometric view of a modified form of the assembly of the present invention;

Figure 5 is an elevational view similar to Figure 1, showing a modified form of the assembly of the present invention in position being installed upon the tire of the wheel;

Figure 6 is a view of the assembly shown in Figure 5 installed on the wheel;

Figure 7 is a plan view of the assembly shown in Figures 5 and 6;

Figure 8 is a view on an enlarged scale, taken on the line 8—8 of Figure 6; and

Figure 9 is an elevational view of a further modified form of the traction assembly of the present invention.

Referring in greater detail to the drawings in which like numerals indicate like parts throughout the several views, in Figures 1 to 3, the reference numeral 10 designates generally the traction assembly for a vehicle wheel mounted tire, according to the present invention. The assembly 10 comprises two diametrically opposed traction shoes 12 and 14 adapted to engage opposed portions of the periphery of a vehicle tire, the latter being designated by the reference numeral 16.

As shown in Figure 3, each shoe 12 and 14 comprises a pair of spaced rods 18 and 20, each conformably shaped to the peripheral portion of the tire 16. Extensions 22 and 24 on the adjacent ends of the rods 18 and 20 converge toward each other and are provided with parallel portions 26 and 28 connected together by a connecting link 30.

Two opposed and substantially similar bar members 32 and 34 are arranged between the shoes 12 and 14 so that they extend in linear overlapped relation. One end of the bar member 32 is adjacent to and is integrally attached to the free ends of the parallel portions 26 and 28 of the extensions 22 and 24 of the one shoe 14. Similarly, one end of the bar member 34 is adjacent to and integrally attached to the parallel portions 26 and 28 of the extensions 22 and 24 of the other shoe 12.

The bar members 32 and 34 are rigid and are provided with means connecting the bar members together for relative movement with respect to each other. Specifically, this means consists in a slot 36, having closed ends, and extending for substantially the full length of the bar member 32. Another closed ended slot 38 extends substantially the full length of the bar member 34. The slots 36 and 38 constitute fastening element receiving means formed on the bar members 32 and 34 intermediate the ends of the latter.

Fastening elements, such as bolt and nut assemblies 40, are employed to secure the bar members 32 and 34 together in any position of their adjusted movement relative to each other. The shank 42 of one of the bolts of one bolt and nut assembly 40 extends through the slot 36 in the bar member 32 and through an opening 44 provided in the adjacent portion of the bar member 34. Similarly, the shank 42 of another bolt of another bolt and nut assembly 40 extends through an opening 46 provided in one end of the bar member 32 and through the adjacent part of the slot 38 in the bar member 34. The shank 42 of another bolt and nut assembly extends through the slots 36 and 38 in the bar members 32 and 34, respectively, intermediate the ends of the latter. The lock washer 48 and a nut 50 on the shank 42 of each bolt and nut assembly 40 serves as a means of securely holding the bar members 32 and 34 together in any position of their movement relative to each other.

The end of each of the bar members 32 and 34 adjacent the respective shoe 12 or 14 is formed with a pair of spaced sockets receiving the adjacent parallel portions 26 and 28 of the extensions 22 and 24. The socket is formed by portions on each side of the respective bar member being rolled over the adjacent extension portion, as indicated by the numeral 52 in Figure 3.

In Figure 4, a modified form of the traction shoe according to the present invention is shown in which the ends of the rods 18' and 20' remote from the bar member 14' are provided with a connecting element 54. Another connecting element 56 extends between the other ends of the rods 18' and 20'. The connecting elements 54 and 56 form anchoring means for at least one length of chain 58 which extends over the peripheral portion of the tire when the modified form of the traction assembly is supported upon the tire of the vehicle.

Referring to Figures 5 to 8, inclusive, another modified form of the traction assembly of the present invention is shown in which the shoes 12 and 14, as described with reference to the traction assembly shown in Figures 1 to 3, inclusive, are employed with other bar members 60 and 62 and an arm 64 interposed between the bar members 60 and 62 and have one end pivotally connected to the fastening element receiving means in the bar member 60 and having the other end pivotally connected to the fastening element receiving means in the bar member 62. In this form of the invention, the fastening element receiving means takes the form of spaced apertures 66 extending along and formed in each of the bar members 60 and 62. The arm 64 is also provided with spaced apertures 66.

One end of the arm 64 is connected by a rivet 68 to the end of the bar member 60 remote from the shoe 14. The rivet 68 extends through the adjacent apertures 66 in the arm and bar member. The shank of a bolt of a bolt and nut assembly 40 extends through one aperture 66 in the bar member 62 and through one of the apertures 66 in the arm 64. The choice of which aperture 66 in either of the arms 64 or bar member 62 depends upon the diameter of the tire 16 and the relative lengths of the bar members 60 and 62. The rivet 68 may be replaced with another nut and bolt assembly 40 if desired so that the adjacent end of the arm 64 may be shifted along the bar member 60 for attachment in one of the holes or apertures 66 therein in a further adjustment of the relative position of the bar members 60 and 62 with respect to each other.

The end of the arm 64 remote from the rivet 68 is provided with a hook 70 which extends over and engages the edge portion of the bar member 60 when the bar members 60 and 62 are brought to their overlapping relation position, as shown in Figures 6 to 8, inclusive.

In Figure 8 is shown most clearly how side portions of the one bar member 60 are turned inwardly and rolled to form sockets, as at 72, for receiving the adjacent parallel portions of the extensions of the respective shoe rods 22 and 24 of the shoes 12 and 14.

In Figure 9 a still further modified form of the traction assembly is shown in which the identical shoes 12 and 14 are employed and are rigidly secured in the ends of other bar members 60' and 62'. These bar members 60' and 62' are connected together by an arm 64' with the rivet 68' connecting one end of the arm 64' to the one end of the bar member 60' remote from the shoe 14. The fastening element receiving means associated with the bar members 60', 62', and the arm 64' take the form of closed slots 74, 76, and 78, respectively. A conventional bolt and nut assembly 40 connects the arm 64' to the bar member 62' in any position of adjusted movement along either the arm or the bar member.

Another conventional type of fastening element may be substituted for the rivet 68' and may be received through the slots 74 in the bar member 60' and the slots 78 in the arm 64', in any position of adjusted movement therealong, if it is desired to adjustably position the connection of the arm 64' to the bar member 60 to accommodate a tire or wheel of another size not illustrated.

In use, the traction assembly 10 of the present invention or the assemblies shown in modified forms in Figures 4, 5 to 8, and Figure 9, may be readily attached to and detached from a tire such as indicated by the numeral 16 on the wheel 80 of the vehicle. In the first form of the invention shown in Figures 1 to 3, the shoes 12 and 14 are easily and with facility positioned on opposed portions of the tire periphery and the bar members 32 and 34 are arranged in overlapping relation prior to insertion therethrough of the bolts of the assemblies 40. Upon tightening of the nuts 50 on the lock washers 48, the bolt and nut assemblies 40 serve as fastening means for securing the bar members 32 and 34 in overlapping fixed relation position.

In the form of the invention shown in Figures 5 to 8, inclusive, the bolt and nut assembly 40 need not be tightened until the arm 64 is swung to the position in which the hook 70 engages the adjacent part of the bar member 60. This draws the shoes 12 and 14 into tight engagement on the tire 16 from which the traction assembly in the form shown is easily removed when it is no longer needed.

In the form of the invention shown in Figure 9, the arm 64' is shifted to a position in which the hook 70' engages the adjacent portion of the bar member 60'. This moves the bar members 60' and 62' into the position in which they overlap with the shoes 12 and 14 in gripping engagement on opposed parts of the tire 16.

In each form of the invention heretofore described and illustrated, a modification may be made in the shoes of the traction assemblies as shown in Figure 4 by the addition of the connecting elements 54 and 56 and the lengths of chain 58 which serve as gripping members when the vehicle is in snow or ice or the like.

What is claimed is:

1. In a traction assembly for a vehicle wheel mounted tire, two diametrically opposed traction shoes adapted to engage opposed portions of the periphery of a tire, each of said shoes comprising a pair of spaced rods each conformably shaped to the peripheral portion of a tire, extensions on the adjacent ends of said rods and converging toward each other, said extensions being provided with parallel portions connected together by a connecting link, two opposed and substantially similar rigid bar members arranged between said traction shoes so that they extend in linear overlapped relation with one end of one of said bar members adjacent to and integrally attached to one of said shoes and with one end of the other of said bar members adjacent to and integrally attached to the other of said shoes, and means connecting said bar members together for relative movement with respect to each other.

2. In a traction assembly for a vehicle wheel mounted tire, two diametrically opposed traction shoes adapted to engage opposed portions of the periphery of a tire, two opposed and substantially similar rigid bar members arranged between said traction shoes so that they extend in linear overlapped relation with one end of said bar members adjacent to and integrally attached to one of said shoes and with one end of the other of said bar members adjacent to and integrally attached to the other of said shoes, and means connecting said bar members together for relative movement with respect to each other, said means including fastening element receiving means formed on each of said bar members intermediate the ends thereof, and a fastening element extending loosely through the fastening element receiving means of said bar members.

3. In a traction assembly for a vehicle wheel mounted tire, two diametrically opposed traction shoes adapted to engage opposed portions of the periphery of a tire, each of said shoes comprising a pair of spaced rods each conformably shaped to the peripheral portion of a tire, extensions on the adjacent ends of said rods and converging toward each other, said extensions being provided with parallel portions connected together by a connecting link, two opposed and substantially similar rigid bar members arranged between said traction shoes so that they extend in linear overlapped relation with one end of one of said bar members adjacent to and integrally attached to one of said shoes and with one end of the other of said bar members adjacent to and integrally attached to the other of said shoes, and means connecting said bar members together for relative movement with respect to each other, said means including fastening element receiving means in the form of an elongated closed slot formed on each of said bar members intermediate the ends thereof, and fastening elements extending loosely through the slots of said bar members.

References Cited in the file of this patent

UNITED STATES PATENTS

| | | |
|---|---|---|
| 2,315,838 | Bryon | Apr. 6, 1943 |
| 2,729,261 | Rucker | Jan. 3, 1956 |
| 2,744,558 | Ciavola | May 8, 1956 |
| 2,820,501 | Heuneman | Jan. 21, 1958 |